May 22, 1962 F. RODIS ET AL 3,035,301
PROCESS AND DEVICE FOR THE MANUFACTURE OF GRANULES
HAVING A DEFINITE GRAIN-SIZE
Filed April 19, 1957 4 Sheets-Sheet 1

INVENTORS:
FRANZ RODIS &
ARNULF HINZ
BY
Connolly and Hutz
THEIR ATTORNEYS

INVENTORS:
FRANZ RODIS &
ARNULF HINZ
BY
Connolly and Hutz
THEIR ATTORNEYS

May 22, 1962 F. RODIS ET AL 3,035,301
PROCESS AND DEVICE FOR THE MANUFACTURE OF GRANULES
HAVING A DEFINITE GRAIN-SIZE
Filed April 19, 1957 4 Sheets-Sheet 3

INVENTORS:
FRANZ RODIS &
ARNULF HINZ
BY
Connolly and Hutz
THEIR ATTORNEYS

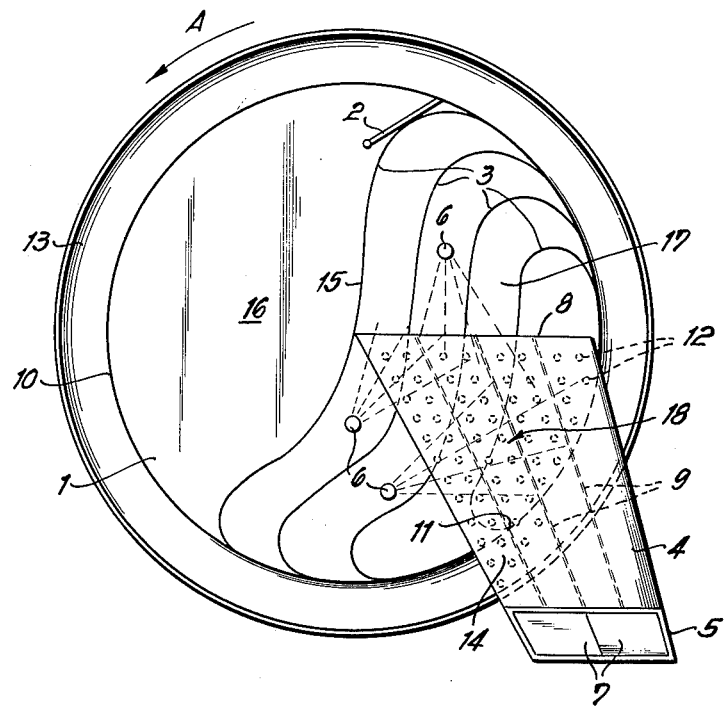

United States Patent Office 3,035,301
Patented May 22, 1962

3,035,301
PROCESS AND DEVICE FOR THE MANUFACTURE OF GRANULES HAVING A DEFINITE GRAIN-SIZE
Franz Rodis and Arnulf Hinz, Knapsack, near Koln, Germany, assignors to Knapsack-Griesheim Aktiengesellschaft, Knapsack, near Koln, Germany, a corporation of Germany
Filed Apr. 19, 1957, Ser. No. 653,949
Claims priority, application Germany Apr. 26, 1956
6 Claims. (Cl. 18—1)

The present invention relates to a process for the manufacture of granules having a definite grain-size and to a device for carrying out said process.

It is already known to granulate powdery materials with the use of an inclined rotary mixing plate. To this end, the rotary mixing plate is usually charged with the powdery material by allowing it to fall on the rotary mixing plate from a conveyer screw or a similar device. Optionally a guide tube may be employed to distribute said material to certain places of the rotary mixing plate. When charged in this manner, the powdery material necessarily arrives at a relatively small and locally limited area of the rotary plate.

It is known that upon granulation in a rotary mixing plate only the largest granules come to the surface of the substance to be granulated and roll off at the ascending side of the lower edge of the plate while the smaller granules remain in the rotary plate until they are big enough. Thus a certain selection takes place on the rotary plate inasmuch as only the largest granules are withdrawn for further use. In charging the rotary plate in the usual manner, it is possible to influence the size of the granules, namely by the peripheral velocity, the inclination and the height of the peripheral edge of the rotary plate and finally by shifting the local charging area where the material arrives at the rotary plate. In spite of the variants mentioned which particularly consist in a variation of the time of stay of the substance to be granulated on the rotary plate, it was hitherto only possible to produce small granules having a diameter of about 10 to about 15 mm. in order not to impair an economic yield of the rotary plate.

In many cases, however, considerably larger granules having a certain minimum solidity or granules with quite a definite grain-size are desired which cannot be obtained according to the known processes.

Now we have found that granules of the kind described above can surprisingly be obtained in a simple manner by charging a circular granulation surface rotating on its vertical axis in a range within the rolling area of the granulation material with a powder veil of the powdery crude substance to be granulated and simultaneously spraying the surface with granulation liquid within the rolling area of the granulation material. The axis of the rotating granulation surface forms with the horizontal line an angle deviating from 90° and the charging area of the substance to be granulated now corresponds to a strip corresponding to about half the diameter of the granulation surface.

The process according to the present invention is generally carried out in a manner such that between 0 and 100% of the rolling area, which is situated between said charging strip and the border zone of the ascending half of the circular granulation surface, is simultaneously powdered with the powdery crude substance to be granulated, said powdering area adjoining however the charging strip.

The characteristic feature of the process according to the present invention therefore consists in the more or less uniform strip or even surface powdering of the rotary mixing plate with the material to be granulated as compared with the known, locally very limited, point-like charge of the surface of the rotary mixing plate.

According to the invention, it is possible for example to operate in a manner such that between about 20 and 100% of the added powdery crude material is charged to the granulation surface along the feeding strip and correspondingly between 0 and about 80% of the crude substance is charged within the powdering area below said strip. It is advantageous that the granulation surface be charged along the feeding strip with between about one third and about half of the added powdery crude substance and correspondingly within the powdering area situated below said feeding strip with between about two thirds and about half of the added powdery crude substance.

The following definitions are given in order to illustrate more closely the terms mentioned in the preceding and the following text, such as granulation surface, rolling area, powdering area, spraying area, after-powdering area, crude substance and granulation material.

By granulation surface, we mean the total bottom surface of the rotary mixing plate corresponding to the about circular rotary plate. The rolling area corresponds to the range of the granulation surface on which the granulation material is actually present being either transported up on the rotary plate or rolling off said plate. The rolling area generally corresponds approximately to the ascending half of the bottom of the rotary plate or the ascending half of the granulation surface. The other descending half of the rotary plate not covered by the granulation material generally serves to clean the bottom of the rotary plate, for example, by scraping off said material by means of knives arranged for this purpose.

The powdery area corresponds to that area of any shape, for example, to the shape of a surface strip, within which the material to be granulated is applied to the rotary plate.

The spraying area likewise corresponds to that area within which the granulation liquid is supplied to the rotary plate. Care must be taken that the powdering area as well as the spraying area are situated within the rolling area of the granulation material. The after-powdering area corresponds to that part of the powdering area which is situated between the spraying area and the overflow edge of the rotary plate located below the latter.

The crude substance is the substance with which the rotary plate or the granulation surface is charged in finely powdered state. The granulation material is the material moving on the rotary plate with continuous growth which finally falls off in the overflow zone over the external edge of the rotary plate. The overflow zone within which the granulation material on the rotary plate reaches the height corresponding to the peripheral edge of the rotary plate is situated in the lower range of the ascending half of the rotary plate.

The feeding strip of the powdery crude substance to the granulation surface can be situated, for example, below the horizontal plane of the diameter of said granulation surface but still inside the rolling areas of the granulation material. Said feeding strip of the powdery crude substance to the granulation surface may also be within the ascending half of the granulation surface in an approximately horizontal radius.

The charging strip as well as the powdering area may also be located below the horizontal plane of the diameter of the granulation surface but still within the rolling area of the granulation material. The feeding strip of the powdery crude substance to the granulation surface is generally situated in an about horizontal radius within the ascending half of said granulation surface, the powdering area being then situated between said feeding strip and the peripheral zone of the circular granulation surface located below the latter.

According to the invention, simultaneously with the powdering there occurs a surface spraying of the granulation liquid within the powdering area of the granulation material.

The surface spraying may simultaneously include the part of the rolling area above the powdered surface portion.

Finally, below the powdering area moistened with granulation liquid an after-powdering of the final granules can take place for externally drying them before they run over from the granulation surface. By this an undesired caking of the overflowing granulation material is avoided in any case. The after-powdering can also take place in a further rotating expansion zone outside the overflowing zone of the granulation surface and in about the altitude of the overflow of the granulated material.

It has been observed that for the production of uniformly small granules having a diameter below 15 mm. the bulk of at least 50% of the powdery crude substance to be granulated and of the granulation liquid must be charged near the center of the granulation surface but still within the rolling area of the granulation material.

Contrary thereto, for the manufacture of uniformly large granules having a diameter between about 15 and about 50 mm. the bulk of at least 50% of the powdery crude substance to be granulated and the granulation liquid are charged near the peripheral zone of the ascending half of the granulation surface.

Finally, for the production of foreign granules corresponding grains are first charged to the granulation surface, a coating of said grains then taking place with an increase of the diameter of the granules by means of the powdery crude substance.

As crude substance for the granulation there may be used all flour-like substances if they are contacted on the rotating granulation surface with a granulation liquid which, optionally, contains necessary additional binding agents.

As crude substances suitable for being granulated there may be mentioned for example crude phosphate, lime, limestone, dolomite, cement, lignite, coke, ferrosilicon or the like as well as mixtures thereof.

Uniform crude phosphate granules with a definite grain-size, i.e. with a diameter below about 15 mm. may be prepared as follows: A circular granulation surface rotating on its vertical axis is charged in a space within the rolling area of the granulation material with a powder veil of the powdery crude phosphate to be granulated.

The surface is simultaneously sprayed with granulation liquid within the powdering area of the granulation material. The axis of the rotating granulation surface forms with the horizontal line an angle deviating from 90° and the charging area of the crude phosphate to be granulated corresponds to a strip of about half the diameter of the granulation surface and an adjoining part of between 0 and 100% of the area situated between said charging strip and the peripheral zone of the circular granulation surface located below the latter. The bulk of at least 50% of he powdery crude phosphate and the granulation liquid are supplied near the center of the granulation surface but still within the rolling area of the granulation material. An after-powdering of the final granules takes place below the powdering area moistened with granulation liquid for externally drying said granules which are about to overflow from the granulation surface.

When producing uniformly large granules having diameters varying between about 15 and about 50 mm. the process of the invention is carried out in a similar manner except that the bulk of at least about 50% of the powdery crude phosphate and the granulation liquid are charged near the peripheral zone of the ascending half of the granulation surface. A surface spraying by means of granulation liquid now simultaneously taking place within the powdering area and preferably also within the part of the rolling area of the granulation material above the powdering area.

In the production of foreign grain granules of crude phosphate, corresponding grains of, for example, coke and/or gravel are first applied to the granulation surface. A coating of said grains takes place while the diameters of the granules are increased by means of the powdery crude phosphate.

When producing large granules, it is possible to use at once pre-formed grains of the same crude substance, that is, to charge them to the rotary plate instead of the small granules that form on the rotary plate or the granulation surface.

The accompanying drawings diagrammatically represent a device for carrying out the process according to the invention.

Figure 1:
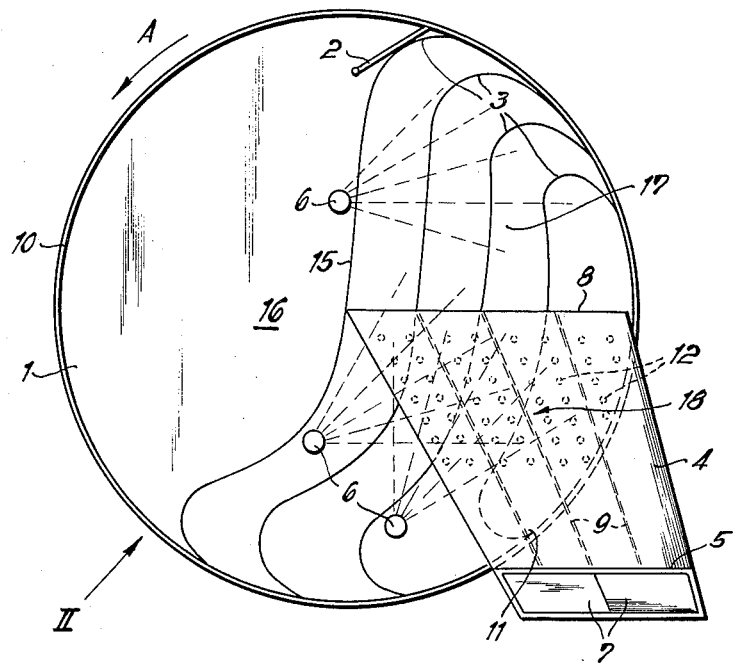
FIGURE 1 represents a plan view of the rotary plate with a charging device in the direction of the axis of the rotary plate according to arrow I of FIGURE 2.
Figure 2:
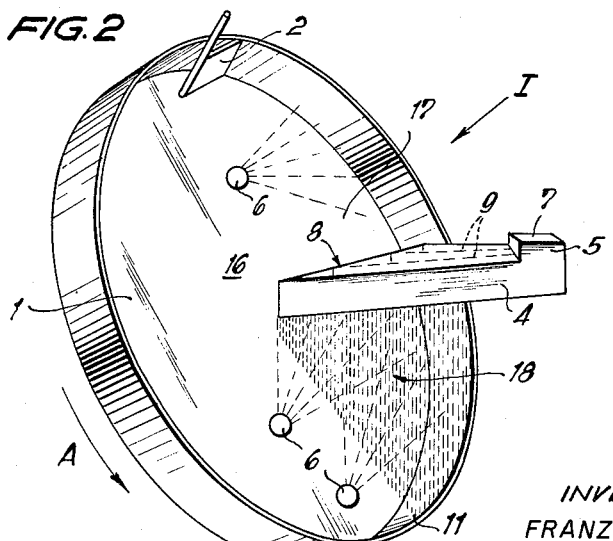
FIGURE 2 represents a three quarter view on the granulation device according to the direction of arrow II of FIGURE 1.

FIGURES 3 to 6 substantially correspond to FIGURE 1, but vary by the different position of the charging device for the substance to be granulated and the different position of the spraying device for the granulation liquid.

FIGURE 7 represents a further granulation device provided with an expansion groove of the edge of the plate which provides an additional powdering area outside the granulation surface.

In the drawings the numerals designate the following parts:

1 is the granulation surface which corresponds to the bottom of the rotary plate rotating in the direction of arrow A. Edge stripper 2 serves for cleaning erected peripheral edge 10 of the bottom of rotary plate 1 and for repulsing the granulation material. By the position of the edge stripper and deflector bar 2 boundary line 15 of rolling area 17 of the granulation material is defined. The course of the granulation material on the rotary plate is represented by so-called rolling curves 3, indicating the way of the granules of different sizes. Through the center of the rotary plate travel the granules having the smallest diameter whereas the inmost curve near the right edge of the plate indicates the way of the largest granules just before overflowing from the rotary plate. Rolling curves 3 are within the ascending half of the rotary plate whereas the descending half of the rotary plate serves as bottom cleaning area 16 for scraping off the bottom of rotary plate 1 by means of common scraping knives not shown.

Vibrating charging device 4 according to the invention is provided with a conveyer case 5 with shutters 7. The front overflow edge of the vibration and feeding device is indicated by 8. The bottom of device 4 is provided with guide bars 9 for guiding the crude substance added by way of case 5. Furthermore, bottom perforations 12 are provided for which may be partially covered at choice by slides (not shown) by which means the size and the position of the powdering area 18 is determined. Nozzle tips 6 serve to spray the granulation liquid. Thereby the spraying area is situated within the rolling area 17.

As shown in FIGURE 7, erected peripheral edge 10 of the circular bottom of rotary plate 1 can be provided with an expanding groove 13, so that the granulation material overflowing at 11 can again be subjected outside granulation surface 1 to an after-powdering within after-powdering zone 14.

The device according to the invention therefore comprises a circular rotary plate of which the vertical axis forms with the horizontal line an angle deviating from 90° and the peripheral edges 10 of which are erected. Cooperating with the plate is a substantially triangular rotary plate. In this case, the layer on the sinter belt can be thicker since contrary to smaller granules, larger granules have a better perviousness to air and to combustion gases heating from above the charge of the sinter belt by means of a gas heating.

By the method according to the invention, the capacity of the rotary plate is considerably improved, as compared with the hitherto usual granulation devices, since the granules, while rolling on the rotary plate, are sprayed and powdered for a prolonged time and more often and thus they reach more quickly the desired diameter. The great technical progress of the invention is based on the observation that the uniformity of the granule size, the production of large granules and the capacity of the rotary plate depend not only on the adjustable inclination of the rotary plate and its peripheral speed but also on the kind of the charge of the crude substance fed to the rotary plate and thus also on the shape of the feeding device used and finally also upon the arrangement of the required spraying devices.

With the process according to the invention the undesired shell-like structure of the granules is fairly avoided by the fact that the powdering and the moistening of the rolling granules on the rotary plate takes place at about the same time.

Now, it has become possible without any inconvenience to manufacture granules with preformed nuclei by charging corresponding grains to the rotary plate. When working up crude materials in order to obtain phosphorus by means of mixtures of crude phosphate, quartz gravel and coke, it is possible, for example to produce granules having coke or gravel nuclei. It is evident that small grains are used for the manufacture of small granules and that some large grains are used for the manufacture of large granules i.e. the size of the grains used depends on the desired proportion between the diameter of the grain and the thickness of the skin. According to the process of the invention there are obtained in any case granules with uniform coating i.e. with uniform thickness of the skin. Only by the new process with the use of grains in the rotary plate has it become possible to manufacture granules having inside nearly exclusively one of these preformed grains whereas with the known granulation processes, in addition to the desired granules with nuclei, up to one half of the granules are formed without nuclei.

A further characteristic feature of the invention consists in the fact that with the use of the adjustable edge stripper and detector bar for the granulation material in the rotary plate, the course of the small granules transported upwards by the rotating plate can be influenced and thus the size of the rolling area determined. The size of the granules depends upon the rolling area size in addition to the new surface powdering. By varying the rolling area it has become possible to determine how often the granules have to pass the powdering area while continuously growing.

For the manufacture of especially large granules, it is practically possible to use the entire rolling area up to the overflow edge as powdering and spraying area. For externally drying the still wet final granules flowing off over the edge of the rotary plate, they are after-powdered in an expanded peripheral zone.

The following examples serve to illustrate the invention but they are not intended to limit it thereto.

*Example 1*

A hydrate of lime which is difficult to granulate, obtained for example with dry gasification of calcium carbide, is granulated according to a known process by feeding it by means of a common dosing screw conveyer or conveyer shute to a rotary plate having a diameter of 1 m. The diameter of the granules cannot be increased to more than about 15 mm. even when various peripheral velocities are applied or the inclination of the rotary plate is varied. Also, when a normal vibration shute is used for charging the crude substance, it is still not possible to increase the diameter of the granules. With this usual procedure, it is only possible to attain diameters of about 12 to 15 mm., automatically resulting for each adjustment of the rotary plate. The capacity of the rotary plate amounts to about 500 kg. per hour.

When applying the process according to the invention, it now is possible to produce large and small granules as desired and according to the varying addition of the powder of hydrate of lime and the granulation liquid. It has been observed that many small grains having a diameter below 15 mm. are formed if the bulk of the powder veil and simultaneously also of the granulation liquid are shifted towards the center of the rotary plate.

In case the ascending side of the edge of the rotary plate is preferably powdered and moistened, the granules become larger without simultaneous change of the inclination of the rotary plate. The diameter of the final granules then amounts to about 30 mm. and the capacity of the rotary plate to 700–750 kg. per hour.

*Example 2*

Crude phosphate, for example Kola phosphate, is fed with a common dosing screw conveyer or conveyer shute to a rotary plate having a diameter of 1 m. Favorable adjustment of the peripheral velocity, inclination and charging plate brings about the production of granules having a diameter of only up to about 15 mm.; the capacity of the rotary plate amounts to 650 kg. per hour.

If Kola phosphate is granulated according to the process of the invention and the powder current of the crude substance is distributed over the rolling area of the rotary plate in a manner such that below the vibration device the small and the large granules are covered from above with powder, all granules grow fast and uniformly. It is necessary that also the granulation liquid is added to the powder current in a corresponding surface distribution. In case only small granules are wanted, the granulation liquid is fed together with the powder veil near the center of the rotary plate. Suddenly small granules are formed which on the way to the edge of the rotary plate are only sparingly moistened and powdered and thus cannot grow any more.

In case large granules are to be produced, a part of the granulation liquid is previously added above the vibration device in order to moisten at this place the granules already formed so that they can subsequently bind the powder trickling down. Furthermore, there are installed below the vibration device moistening devices moistening the center as well as the peripheral parts of the granulation area. The bulk of the crude substance is simultaneously added in the form of a powder veil within said peripheral parts. In each case only a few new and small granules are formed. While travelling on the rotary plate these formed granules are repeatedly moistened above and below the vibration device in a manner such that they can continuously bind powder and thus quickly grow to the desired grain size above 15 mm. Thus, it is possible continuously to produce granules having a diameter of about 30, 40 and even 50 mm.

With the surface distribution of the granulation liquid and the crude powder the capacity of the rotary plate can be increased considerably to 950–1000 kg. per hour.

*Example 3*

The rotary plate has a diameter of 1 m. corresponding to a granulation surface of 0.785 sq. m. The inclination of the rotary plate to the vertical line amounts to 42°; the inclination of the granule surface at a filled rotary plate to the vertical line correspondingly amounts to about 45°. The plate rotates at a rate of 0.84 m. per second, e.g. 16 revolutions per minute.

With a known charge of crude phosphate by means and substantially horizontal arranged vibration device 4, covered at the top and having a one side truncated tip. The vibration device 4 serves as a feeding device for charging the rotary plate with the powdery crude substance to be granulated. In the obtuse tip of the vibration device 4 facing away from the rotary plate, there is arranged a feeding case 5 for the powdery crude substance. Overflow edge 8 of the feeding device 4 opposite the obtuse tip is arranged above and is about parallel to the bottom of rotary table 1. The device also consists of nozzle tips 6 adjustable in position, direction and height which are arranged above the rotary plate but outside the surface of the rotary plate covered by vibration device 4, which nozzle tips serve to spray rolling area 17 of bottom of rotary plate 1 with the granulation liquid.

Cleaning devices are arranged in the descending half of the rotary plate for cleaning the bottom outside rolling area 17. An edge stripper and detector bar 2 operates in the rotary plate for guiding the granules thus defining rolling area 17.

In the bottom of vibration and feeding device 4, there are perforations 12 for powdering granulation surface 1 of the rotary plate with the powdery crude substance. It is furthermore possible to provide vibration device 4 with slides (not shown) for covering here and there perforations 12 thus defining the position and the size of powdering area 18. Finally the bottom of vibration and feeding device 4 is provided with guide bars 9 for regulating the transport of the added crude substance.

On the conveyer device 5 arranged at the obtuse tip of vibration device 4, shutters 7 are mounted to regulate the addition of the powdery crude substance to the vibration and feeding device 4.

According to the invention, the vibration and feeding device 4 is interposed between the rotary plate and the hitherto common feeding device for a locally limited charge of the crude substance to the granulation surface of the rotary table consisting for example of a tube or a funnel. The crude substance is not therefore directly fed from the tube or funnel mouth to the rotary plate but first to conveyer case 5 of the novel vibration device 4.

According to the invention said vibration and feeding device 4 can be adjusted with regard to its height and horizontal distance from the bottom of rotary plate 1.

Figure 4:
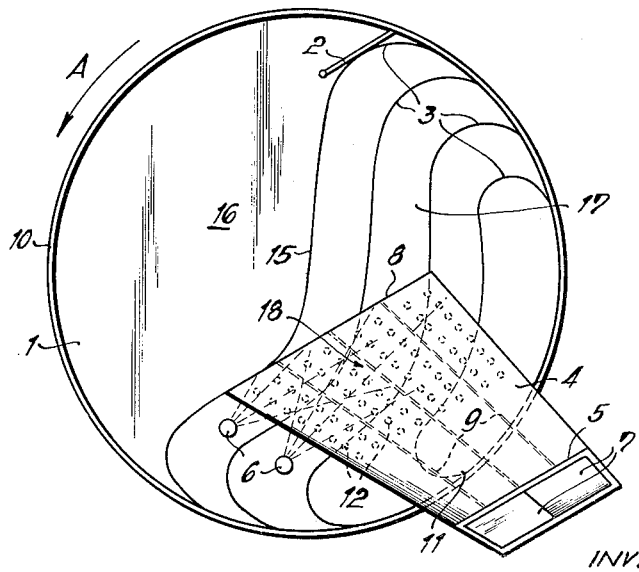

Finally, vibration and feeding device 4 may be swingable within its about horizontal position (FIG. 4).

FIGURES 1, 2, 3, 5 and 7 represent a granulation device in which the feeding strip for the powdery crude substance to the granulation surface and hence the overflow edge 8 along which the crude substance falls on said granulation surface, are arranged in substantially horizontal radius within the ascending half of the rotary plate. In FIGURES 1, 2, 3 and 7, the feeding strip adjoins, as shown by perforations 12 in the bottom of vibration device 4, powdering area 18 which is situated between said feeding strip along overflow edge 8 and the vertical peripheral edge 10 of the circular granulation surface arranged below the latter; the size and position of said powdering area 18 may be varied by cover slides.

FIGURE 1 represents, for example, an arrangement for the manufacture of large granules. The powder current of the crude material is guided substantially to the right side of vibration device 4 and thus to the edge of the rotary plate by adjusting shutters 7 in conveyer case 5 of vibration device 4 whereas the granulation liquid is sprayed on rolling area 17 above as well as below said vibration device 4. By this, first relatively few and still small grains are formed. These few grains must pass several times the liquid and powder veil while continuously growing before they can be discharged in overflow zone 11.

Figure 3:
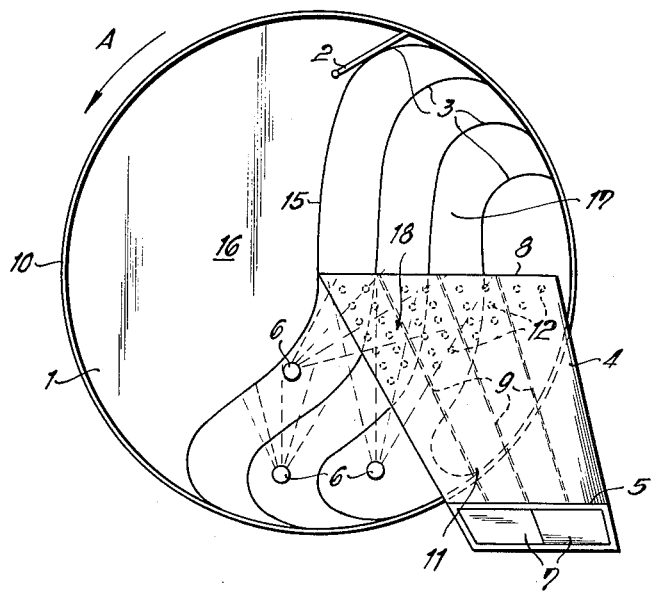

FIGURE 3 represents an arrangement for the production of small granules. The powder and liquid veil are guided substantially to the center of the rotary plate so as to form many small grains.

Since in the now starting migration of said grains, the powdery crude material is fed to the edge of the rotary plate only in an amount such that the formed final granules have a dry coating or external skin they still grow very little.

The same effect can be obtained when for the manufacture of small granules vibration and feeding device 4 is swung towards the center of the rotary plate as shown by FIGURE 4 instead of using the guided charge of the crude substance by way of shutters 7 of conveyor case 5 and by correspondingly covering perforations 12 of vibration case 4 facing the edge of the rotary plate according to FIGURE 3.

Figure 5:
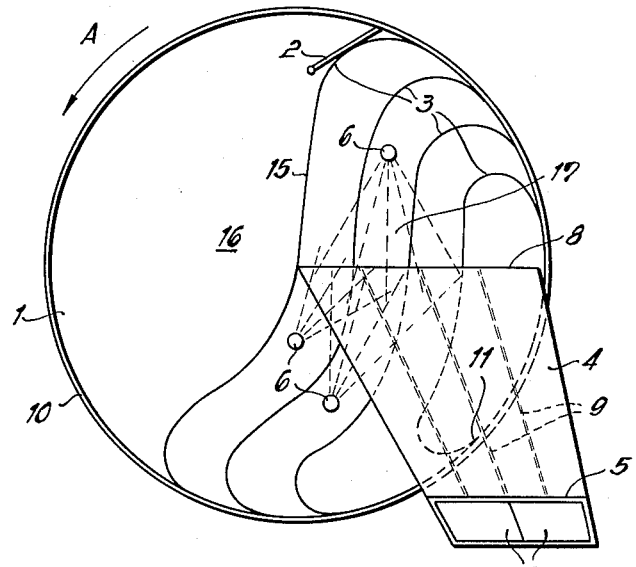

FIGURE 5 finally represents an arrangement in which all bottom perforations 12 of vibration device 4 are wholly covered or even omitted, whereby the powder veil of the crude substance only arrives at rolling area 17 of granulation surface 1 along a strip below overflow edge 8 of feeding device 4. In this case, the spraying area may correspond to the powdering strip of about half the diameter of the granulation area. The width of the powdering strip depends on the height of the powder veil and thus on the distance of overflow edge 8 of vibration device 4 from the bottom of the rotary plate.

Figure 6:
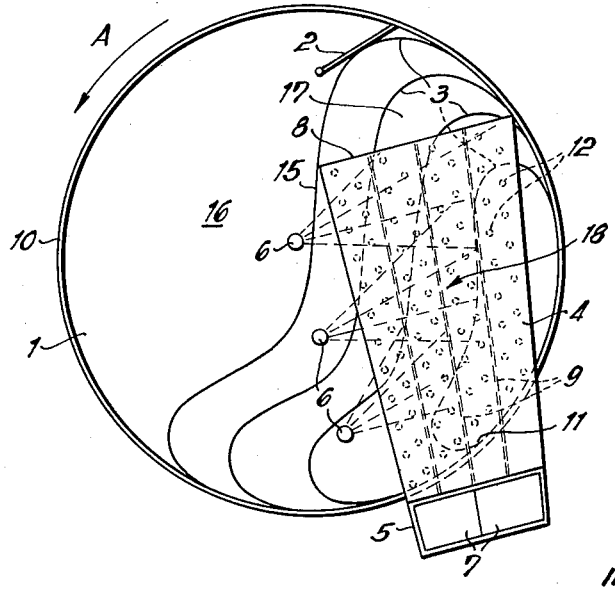

FIGURE 6 represents an optimum utilization of rolling area 17 as powdering area 18 and FIGURE 7 finally represents a rotary plate provided with a rotating expansion groove 13 of erected peripheral edge 10 of the bottom of rotary plate 1. Thus, an after-powdering area 14 is formed on the rotary plate outside overflow zone 11 of the granulation material so that spraying can take place within the rolling area 17 up to the erected peripheral edge 10 and said overflow zone 11.

In the process according to the invention the powder current is fed not directly to the rotary plate but the powdery current is first collected in a feeding device and then distributed more or less uniformly from an otherwise limited charging space over a large area. The rotary plate is then charged with the crude substance in the form of a powder veil. By the continuous vibration of the new feeding device the added powdery crude substance is uniformly distributed between the single guide bars on the substantially triangular bottom of the vibration device. By this, the charge of the crude material to the rotary plate is carried out, contrary to known processes, not only locally but within a larger powdering area.

It is now possible, as proved by experiments, to determine more closely the desired grain-sizes of the granulation material. By the process according to the invention, it is fairly possible to obtain the desired grain-sizes by varying the charging places for the powdery crude material and the granulation liquid.

The condition required is that the granulation liquid and powder current are fairly distributed on the area. In case the powder and the liquid are not fairly distributed more or less large amounts of solid substance and liquid adhere to the single granules and an absolutely uniform distribution can only be attained by the rolling motion of the granules on the rotary plate. In case, however, the solid substance and the liquid are fed to a large area in a more or less uniform distribution the already preformed granules receive at once a more uniform coating and they can grow faster. This fact leads to an increase in yield of the rotary plate as well as the formation of larger granules.

Thus, it is now possible according to the process of the invention to obtain uniform granules having a diameter up to 40 mm. and even to about 50 mm. It is especially advantageous to have fairly large granules on the sinter belt connected in series with the rotary plate when the granules obtained are to be calcined after leaving the of a common feeding device to a relatively small and limited space of the rotary plate granules are obtained having a diameter of 12 to 15 mm. In case Kola phosphate is used having a density of 3.06 and a bulk weight of 1.98, the capacity of the rotary plate amounts to 650 kg. per hour. In case Florida phosphate is used having a density of 2.77 and a bulk weight of 1.05, the capacity of the rotary plate amounts to only 350 kg. per hour.

By bulk weight there is to be understood the weight of the unit of volume of the material loosely piled up, i.e. with air interspaces, in kg. per liter. The consumption of water in the case of Kola phosphate amounts to about 10% by weight calculated on the weight of the dry substance that is to about 65 kg. per hour. With Florida phosphate, the consumption of water is higher, namely about 16% by weight, e.g. 56 kg. per hour. The time of stay on the rotary plate from the moment of the powdering to the overflow of the final granules amounts in the case of Kola phosphate to 3½ minutes and in the case of Florida phosphate to 6 minutes.

When, according to the process of the present invention, the crude substance is added within a powdering strip along the total latitude of the overflow edge 8 (side of the triangle of vibration device 4) larger granules can be obtained having a diameter of about 15–18 mm. The capacity of the rotary plate is then considerably higher namely for Kola phosphate 750 kg. and for Florida phosphate 430 kg. per hour. The time of stay on the rotary plate decreases correspondingly, in the case of Kola phosphate, to about 3 minutes and in the case of Florida phosphate to about 4¾ minutes. The consump- of water amounts with Kola phosphate as usual to 10% by weight, consequently now to 75 kg. per hour, the consumption of water of Florida phosphate now amounts to 69 kg. per hour corresponding to the higher yield of the plate.

*Example 4*

The capacity of the rotary plate may be further increased by combining the strip powdering according to Example 3 with a surface powdering below the feeding and vibration device up to the external edge of the rotary plate. In the case of Kola phosphate, the capacity then amounts to about 1000 kg. per hour and with Florida phosphate to about 750 kg. per hour. Simultaneously, considerably larger granules are obtained having a diameter of about 25 mm.

The distribution of the crude substance is generally carried out in a manner that about ⅓ of the crude substance is charged along the powdering strip below overflow edge 8 and about ⅔ of the crude substance are charged in the form of a surface powdering below the bottom of the vibration device to the granulation surface of the rotary plate. In the case of Kola phosphate, for example, 350 kg. serve for strip powdering and about 650 kg. for surface powdering and in the case of Florida phosphate, 250 kg. for strip powdering and 500 kg. for surface powdering. The consumption of water amounts to 100 kg. per hour for Kola phosphate and to 120 kg. per hour for Florida phosphate, the distribution of the granulation liquid being adjusted to the distribution of the crude powder, i.e. ⅓ of the liquid is charged in each case above the feeding device or along the feeding strip and ⅔ of the liquid are charged within the powdering zone in finely distributed form.

The time of stay on the rotary plate is now very short; in the case of Kola phosphate it amounts to only 2 minutes and with Florida phosphate to about 2¾ minutes.

*Example 5*

When the external edge 10 of the bottom of rotary plate 1 is additionally provided with a likewise rotating expanded groove 13, the surface powdering and spraying can take place within the rolling area 17 and below vibration device 4 up to said peripheral edge 10; in this case, however, an after-powdering takes place for externally drying the overflowing final granules within overflow zone 11 and also outside the peripheral edge 10 of the rotary plate in expanded groove 13 at 14. While otherwise proceeding as described in Example 4, the after-powdering is carried out at 14 using additionally about 3% by weight of the crude substance which corresponds to an additional amount of 30 kg. of Kola phosphate or about 23 kg. of Florida phosphate per hour.

*Example 6*

According to the process of the invention small granules shall be produced having a diameter between about 12 and 15 mm. In this case, the material is preferably charged near the center of the rotary plate. The addition depends on the granulation properties of the crude substance used. Kola phosphate, for example tends to form relatively large granules while Florida phosphate forms small granules.

When charging the material by distribution, it is generally not desired and even impossible accurately to separate the vibration device 4 in determined zones since by the vibration according to the invention a distribution of the material over the entire latitude of the bottom of feeding device 4 takes place. It is only possible to modify the height of the layer by means of shutters 7 in conveyer case 5 and by means of guiding bars 9, which layer in the present case for the production of small granules decreases continuously from the center to the peripheral edge of the rotary plate already within vibration device 4, of which overflow edge 8 is arranged in about a horizontal radius of the descending half of the rotary plate. Smaller amounts of the powdery crude substance then continuously arrive at the rotary plate from the center towards the edge of said plate over overflow edge 8 in the form of a powder veil.

The rotary plate has an inclination of 40° to the vertical line and rotates with 14 revolutions per minute.

The distribution of the crude powder is carried out in about the following manner: When Kola phosphate is used, ⅓ of the crude substance arrives in the form of a strip powdering over overflow edge 8 and ⅔ in the form of a surface powering through bottom perforations 12 of vibration device 4 at rolling area 17 of granulation surface 1. ⅔ of the total amount of the crude substance are conveyed towards the center and ⅓ towards the peripheral zone of the rotary plate. When Florida phosphate is used also ⅓ of the crude substance is used for strip powdering and ⅔ for surface powdering while the total crude substance is simultaneously guided in a manner that about ⅗ are conveyed towards the center and correspondingly ⅖ towards the peripheral zone of the rotary plate.

The distribution of the sprayed granulation liquid within the moistening zone is carried out like the distribution of the solid substance within the powdering zone. The powdering area can coincide with the moistening area with the exception of a small after-powdering zone for externally drying the final granules.

*Example 7*

For the manufacture of larger granules having a diameter of about 25–30 mm. the addition is carried out vice versa namely mainly towards the peripheral zone of the rotary plate. The rotary plate has an inclination of 42° to the vertical line and rotates with about 16 revolutions per minute.

When Kola phosphate is used, the distribution is now carried out in a manner that for the strip powdering ⅓ of the crude substance is charged to the rotary plate over overflow edge 8 and ⅔ for surface powdering through bottom perforations 12 of vibration device 4. Simultaneously only about ⅓ of the total crude substance is conveyed towards the center of the rotary plate, whereas about ⅔ are fed towards the peripheral edge of the rotary plate to rolling area 17 of the bottom of rotary plate 1. Also when Florida phosphate is used as crude substance ⅓ serves for strip powdering and ⅔ for surface powdering, whereas now only about ¼ of the total crude substance is charged towards the center and correspondingly about ¾ towards the peripheral edge of the rotary plate. The distribution of the granulation liquid is carried out like the distribution of the powdery crude substance.

*Example 8*

By first charging foreign grains to the rotary plate coke shall be embedded in crude phosphate, namely 6 kg. of coke in 260 kg. of Florida phosphate then 12 kg. and finally even 18 kg. of coke in likewise 260 kg. of Florida phosphate. The granules shall have a diameter between 25 and 30 mm. and the coke grains shall have a skin or coating of phosphate of at least 5 mm. In this case the size of the final granules is determined not only by the inclination of the rotary plate and the distribution of the crude phosphate when charging the rotary plate but also by the size of the first charged grains and thus by avoiding the formation of granules free from foreign nuclei.

In the case of the desired proportion of 6 kg. of coke to 260 kg. of Florida phosphate the required diameter of the coke grains is about 10 mm.; this corresponds to a surface of 0.697 sq. m. per kg. of charged foreign grains.

The formed final granules, e.g. with the phosphate skin have a diameter of 27.5 mm. The thickness of the phosphate skin is 8.7 mm.

When 12 kg. of coke are embedded in 260 kg. of Florida phosphate the required diameter of the coke grains amounts to 12 mm. corresponding to a surface of 0.582 sq. m. per kg. of charged foreign grains. The final granules formed on the rotary plate according to the process of the invention have a diameter of 26.6 mm. which corresponds to a crude phosphate coating of 7.3 mm.

When 18 kg. of coke are embedded in 260 kg. of Florida phosphate the required coke grains have a diameter of 14 mm. and thus a surface of 0.499 sq. m. per kg. The formed final granules have a diameter of 27.5 mm. with a crude phosphate skin of 6.78 mm.

We claim:

1. A process for the continuous manufacture of granules of determined size upon an angularly rotating disc which comprises continuously feeding from a feeding area a vibrated stream of pulverulent particles in a fine haze-like condition that is evenly spread and evenly moistened within a comparatively large area of the vertically inclined disc, said area corresponding in size to the feeding area and being locally adjustable with reference to the granulating disc in accordance with the desired size of the granules, whereby a portion of said particles are carried upwardly along said rotating inclined surface and then roll down under the influence of gravity modified by the peripheral speed of the rotating disc, simultaneously evenly moistening in dosable manner the particles available in a predetermined area of said rotating inclined surface with a liquid, and limiting the upward path of said particles on said rotating inclined surface in such a manner that all the particles carried upwardly will fall within a predetermined treating area on said rotating inclined surface.

2. Apparatus for manufacturing granules of determined size which comprises a circular disc mounted for rotation about an axis adjustably inclined to the vertical, said disc having a peripheral upwardly extending flange to define a shallow rim, a feed device positioned in a generally horizontal plane and having an adjustable number of discharge openings on its bottom adjacent the inclined surface of said disc, said feed device being provided with a vibrator to ensure a haze-like even repartition of the pulverulent particles to be treated, and individually adjustable liquid-sprinkling means positioned to evenly sprinkled liquid in regulable quantities onto predetermined areas of the inclined surface of said disc.

3. The process of claim 1 wherein the upward path of said particles is adjustably limited.

4. The process of claim 1 wherein said particles are passed against said rotating inclined surface and roll down thereon while being intermixed with finely divided pulverulent coating material which aggregates on said particles while they roll down said surface.

5. The apparatus of claim 2 wherein said feed device and said liquid sprinkling device are radially and circumferentially adjustable relative to said inclined surface.

6. The apparatus of claim 2 wherein an adjustable impingement plate and said liquid sprinkling device are mounted on said inclined surface of said disc adjacent the periphery thereof and in circumferentially-spaced relation to said feed device.

References Cited in the file of this patent

UNITED STATES PATENTS

| 1,239,221 | Rodman | Sept. 4, 1917 |
|---|---|---|
| 1,347,484 | Brown | July 20, 1920 |
| 1,537,348 | Grossmann | May 12, 1925 |
| 2,436,771 | Hood | Feb. 24, 1948 |
| 2,593,326 | McAskill | Apr. 15, 1952 |
| 2,627,457 | Kerley | Feb. 3, 1953 |
| 2,836,846 | Meyer | June 3, 1958 |
| 2,889,576 | Selig | June 9, 1959 |

FOREIGN PATENTS

| 530,620 | Belgium | Aug. 14, 1954 |
|---|---|---|
| 915,072 | Germany | July 15, 1954 |
| 758,323 | Great Britain | Oct. 3, 1956 |